(12) United States Patent  
Huh et al.

(10) Patent No.: US 8,100,215 B2  
(45) Date of Patent: Jan. 24, 2012

(54) MODULE FOR DETECTING A VEHICLE CRASH AND AN AIRBAG DEPLOYING SYSTEM INCLUDING THE SAME

(75) Inventors: Hoon Huh, Daejeon (KR); Sang Soon Cho, Daejeon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 670 days.

(21) Appl. No.: 12/238,610

(22) Filed: Sep. 26, 2008

(65) Prior Publication Data

US 2009/0088921 A1   Apr. 2, 2009

(30) Foreign Application Priority Data

Sep. 28, 2007 (KR) .......................... 10-2007-0098269

(51) Int. Cl.
*B60K 28/10* (2006.01)
(52) U.S. Cl. ........................ 180/274; 280/735
(58) Field of Classification Search .................. 280/735, 280/730.1; 180/274, 271; 296/35.2; 701/29
See application file for complete search history.

(56) References Cited

U.S. PATENT DOCUMENTS

| | | | | |
|---|---|---|---|---|
| 3,793,498 A * | 2/1974 | Matsui et al. | ........... | 200/61.45 R |
| 3,853,199 A * | 12/1974 | Hirashima et al. | ............ | 180/274 |
| 3,974,350 A | 8/1976 | Breed | | |
| 5,237,134 A * | 8/1993 | Thuen et al. | .......... | 200/61.45 M |
| 5,416,293 A * | 5/1995 | Reneau | ................. | 200/61.45 M |
| 6,234,519 B1 * | 5/2001 | Breed | ........................... | 280/735 |
| 7,556,118 B2 * | 7/2009 | Huh et al. | ...................... | 180/274 |
| 2001/0028163 A1 | 10/2001 | Breed | | |
| 2007/0235996 A1 | 10/2007 | Huh et al. | | |

FOREIGN PATENT DOCUMENTS

EP   1 350 682 A2   10/2003
EP   1 604 870 A2   12/2005

* cited by examiner

*Primary Examiner* — Faye M. Fleming
(74) *Attorney, Agent, or Firm* — Patterson Thuente Christensen Pedersen, P.A.

(57) ABSTRACT

Embodiments of the present invention may provide a module for detecting a vehicle crash. The module includes a housing mounted to a vehicular frame member at one end portion thereof. The module includes first and second rods housed in the housing. The first rod is contacted to the frame member at one end thereof through the one end portion of the housing. The second rod is contacted to the opposite end of the first rod and being disposed between the first rod and the opposite end portion of the housing. The module includes first and second sensors mounted to the first and second rods respectively for detecting a crash by sequentially measuring stress wave caused by the crash. The first sensor detects a stress wave propagating through the first rod and outputting a signal. The second sensor detects a stress wave propagating through the second rod and outputting a signal. The module includes a biasing member disposed between the second rod and the opposite end portion of the housing for biasing the first and second rods toward the frame member. A magnitude of impedance of the first rod is larger than that of the second rod and the magnitude of impedance of the second rod is larger than that of the biasing member. The module can remarkably reduce the elapsed time required for detecting a crash by measuring a stress wave, which propagates very rapidly through a vehicular frame member.

12 Claims, 9 Drawing Sheets

MODULE FOR DETECTING A VEHICLE CRASH AND AN AIRBAG DEPLOYING SYSTEM INCLUDING THE SAME

The present application claims priority to Korean Patent Application No. 10-2007-0098269 filed on Sep. 28, 2007, the subject matter of which is incorporated herein by reference.

BACKGROUND

1. Field

Embodiments of the present invention relate to a module for detecting a vehicle crash, and more particularly to a module for detecting a vehicle crash, which allows quickly detecting occurrence of a vehicle crash by sequentially measuring stress wave that propagates through a vehicular frame member after such crash. Further, embodiments of the present invention relate an airbag deploying system for a vehicle including such a module.

2. Background

Generally, an airbag deploying system for a vehicle is configured such that inflators for generating gas are operated based on signals generated from crash sensors for detecting a vehicle crash in order to deploy airbags.

Three types of crash sensors have been generally used in such an airbag deploying system. The first is an electro-mechanical crash sensor wherein an electrical circuit is closed by the movement of a sensing mass caused by the inertia thereof in the event of a collision. The second is an electronic crash sensor, which utilizes the unique features of an electronic circuitry such as memory and programmability, thereby implementing the criteria for identifying and discriminating signals in the event of a collision. The last is an all-mechanical crash sensor, wherein a firing pin is released so as to ignite an inflator when the impact caused by the collision is sufficiently high enough to rotate a trigger shaft beyond a predetermined magnitude. Among them, the electro-mechanical crash sensor has been widely used for the airbag system since its cost is relatively low and the airbag system can be fairly easily diagnosed.

FIGS. 1 and 2 are sectional views of a prior art ball-in-tube sensor 10, which is one example of the above-mentioned electro-mechanical crash sensor. This sensor is manufactured by Breed Automotive Corporation and includes a sensing-mass 15 such as a steel ball and a tube 14, as disclosed in U.S. Pat. No. 3,974,350.

A magnet 12, which is disposed at one end of the tube 14, attracts the sensing-mass 15 towards one end of the tube 14. Under regular driving or braking conditions (or even in minor collisions), the attractive force of the magnetic 12 prevents the sensing-mass 15 from moving. When a collision of greater magnitude occurs, the sensing-mass 15 can move away from its resting location. If the impact is sufficiently strong and lasts long enough for the sensing-mass 15 to touch the contact 13 disposed at the opposite end of the tube 14, then the sensing-mass 15 bridges two contacts 13 and thereby closes an electrical circuit. The circuit closure sends an electrical current to an inflator, thereby initiating the deployment of an airbag.

When the sensing-mass 15 moves within the tube 14, the air within the sensor flows from one side of the sensing-mass 15 to the other side through the clearance between the sensing-mass 15 and the tube 14. Such airflow generates a drag force that dampens the movement of the sensing-mass 15. The magnitude of the damping force depends primarily on the movement of the sensing-mass 15 and the tightness of the clearance. Other factors such as the amount of air behind the sensing-mass 15, pressure and temperature within the sensor also play a role in the damping phenomenon.

In the above-described ball-in-tube sensor 10, when the crash occurs, the sensing-mass 15 moves from the normal position adjacent to the magnet 12 to the contacts 13 in response to the deceleration of the vehicle and against the attractive force of the magnet 12 and the drag force of the air. In such a case, it was found that it takes 10~20 ms to detect the crash by the electric-mechanical crash sensor such as the above-described sensor 10. It was also found that it takes 40~50 ms to fully deploy the airbag from the airbag system. Accordingly, there is a need to reduce the time required for detecting a crash so as to deploy the airbag in a timely manner.

Further, the above-discussed prior art crash sensors are installed at several places of the interior of the vehicle. As a result, there is a problem in that it is cumbersome and difficult to mount, repair and replace such crash sensors.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
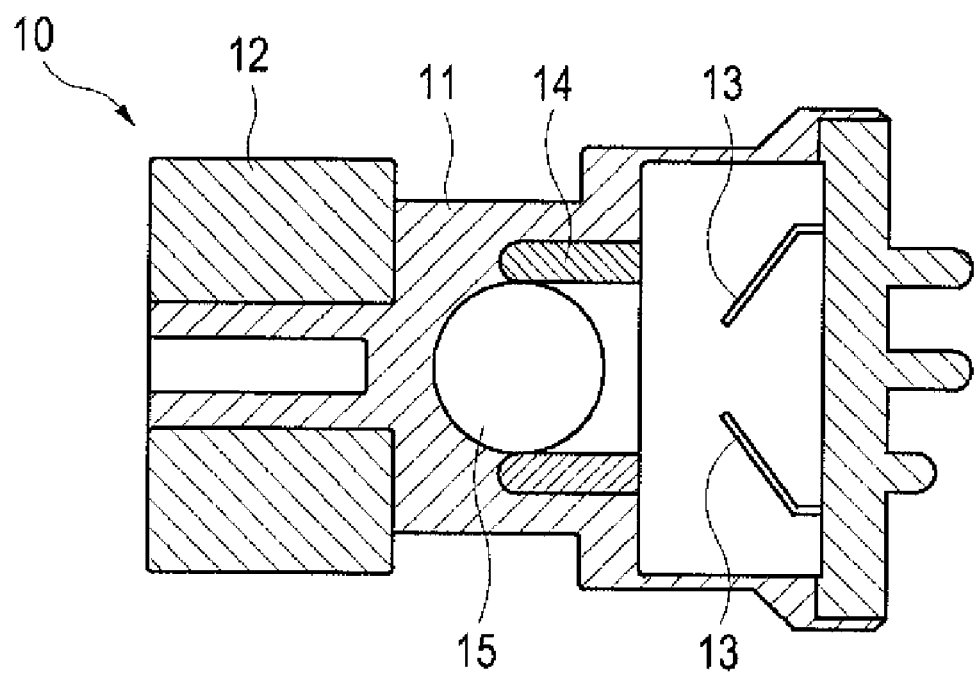
FIG. 1 is a sectional view of a prior art ball-in-tube sensor in an inactivated state.
Figure 2:
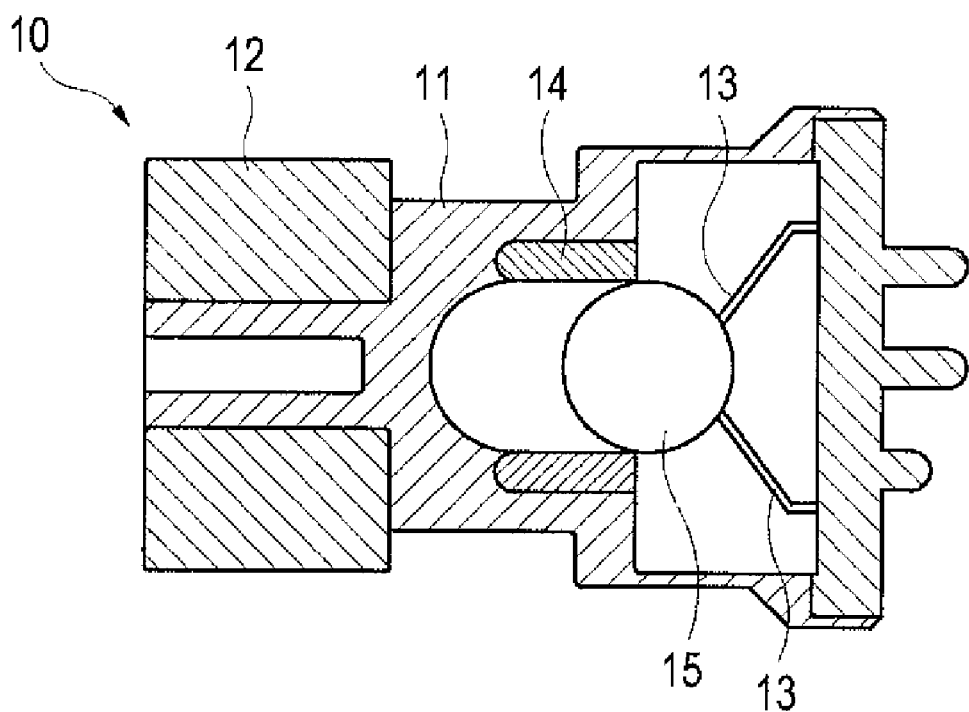
FIG. 2 is a sectional view of the prior art ball-in-tube sensor of FIG. 1 in an activated state.
Figure 3:
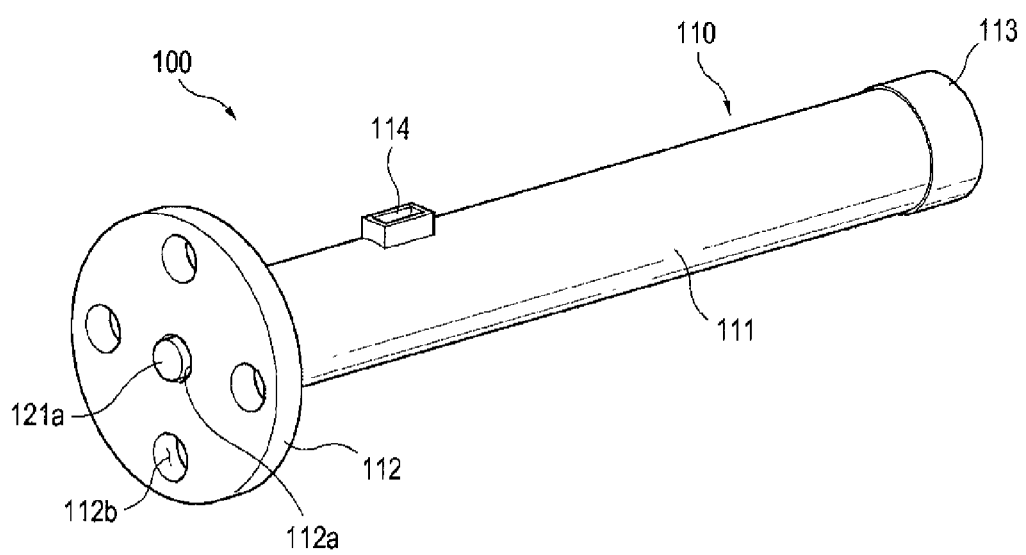
FIG. 3 is a perspective view of a module for detecting a vehicle crash according to one embodiment of the present invention.
Figure 4:
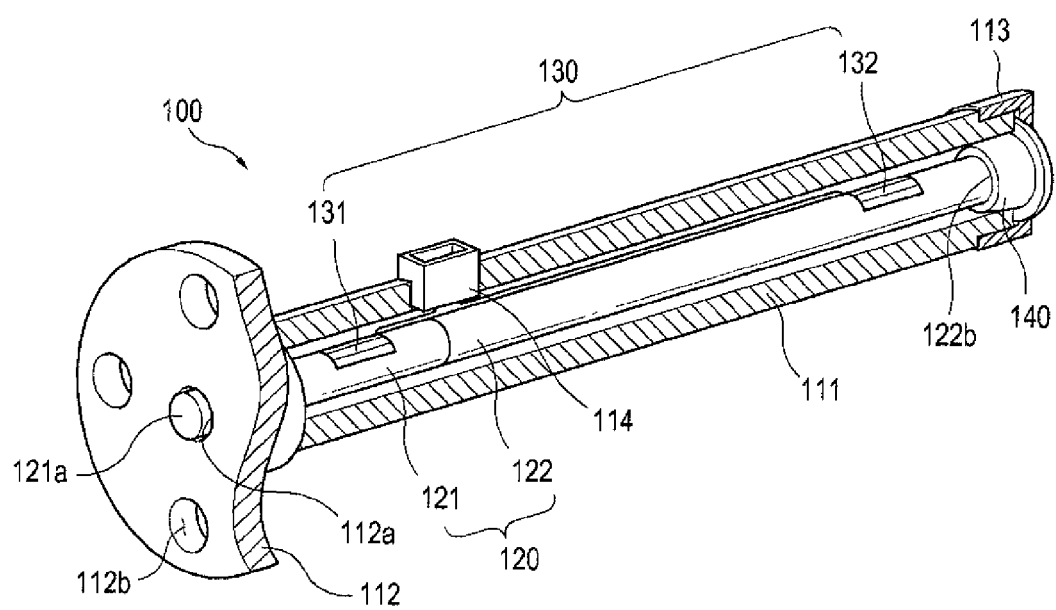
FIG. 4 is a partial cutaway perspective view of the module for detecting a vehicle crash of FIG. 3.

FIG. 3 is a perspective view of a module for detecting a vehicle crash according to one embodiment of the present invention. FIG. 4 is a partial cutaway perspective view of the module for detecting a vehicle crash of FIG. 3.

Referring to FIGS. 3 and 4, the module for detecting a vehicle crash 100 comprises the following: a housing 110 mounted to a frame member (not shown) of a vehicle; a rod member 120, into which a stress wave propagates from the vehicular frame member at the event of crash, the rod member being housed in the housing 110 or supported by the housing 110; a plurality of stress wave detecting sensors 130 mounted to the rod member 120 in a length direction thereof for detecting the stress wave and outputting signals; a biasing member 140 disposed between the rod member 120 and the housing 110 for biasing the rod member 120 toward the frame member.

The housing 110 may have a cylindrical body 111. Further, the housing 110 may have any suitable shape for supporting or housing the rod member 120 thereon or therein. One end portion of the housing 110 includes a flange 112 integrally formed with the cylindrical body 111. The flange 112 has a through-hole, through which one end 121a of the rod member slightly projects, at a center thereof and a plurality of through-holes 112b for bolt-securing radially outward of the center. The opposite end portion of the housing 110 include a cap 113 fitted to the opposite end of the cylindrical body 111. A connector 114 is provided in the middle of the body 111 of the housing 110 and is connected to the sensors 130 via electric wires. The module 100 may be connected to an electronic control unit of an airbag deploying system by mating the connector 114 and its counterpart connector (not shown), which is connected to the electronic control unit of the airbag deploying system. The airbag deploying system and its electronic control unit will be described later.

The rod member 120 has a circular rod shape of a predetermined length. The rod member is made from metallic material. The rod member 120 is oriented parallel to or in a path, along which the stress wave caused by a vehicle crash propagates through a frame member of a vehicle. Since the rod member 120 is housed and supported by the housing 110, the orientation of the rod member 120 can be determined by mounting the housing 110 to the frame member.

The rod member 120 comprises a first rod 121 brought into contact with the frame member at one end thereof and a second rod 122 contacted to the opposite end of the first rod 121 at its one end and to the biasing member 140 at its opposite end. The overall length of the first and second rods 121 and 122 is determined such that the one end 121a of the first rod 121 projects slightly outward through the through-hole 112a of the flange.

When the module 100 is mounted to the frame member of a vehicle, a counteraction due to bolt-securing and the force of the biasing member 140 accomplish close contact or surface contact between the one end 121a of the first rod and the frame member. Accordingly, the stress wave caused by a vehicle crash is introduced to the first rod 121 via the vehicular frame member and, subsequently, to the second rod 122. The introduced stress wave propagates through the first and second rods 121 and 122. As such, the stress wave can be transferred to the first rod 121 without any disturbance Since the rod member 120 is divided into the first and second rods 121, 122, the stress wave passes through several interfaces while going through the rod member. Hereinafter, one interface between the first rod 121 and the second rod 122 is referred to as a first interface 120a, while another interface between the second rod 122 and the biasing member 140 is referred to as a second interface 120b.

The sensors 130 comprise a first sensor 131 mounted to the first rod 121 and a second sensor 132 mounted to the second rod 122 as being apart at a predetermined interval. Thus, the stress wave can be sequentially measured at a predetermined time interval while propagating from a collision point toward the inside of a vehicle. Further, the discontinuous propagation occurs when the stress wave goes through the interface 120a between the first and second rods 121 and 122. Therefore, the output from the first sensor 131 mounted on the first rod 121 and the output from the second sensor 132 mounted on the second rod 122 can be outputted discriminatively and definitely, thereby preventing the outputs from overlapping each other.

The first and second sensors 131, 132 may include any type of sensor capable of measuring or detecting the stress wave propagating through any metallic member similar to the frame members of the vehicle frame. Preferably, the sensors 131, 132 include a strain gauge sensor or a piezoelectric strain sensor. The strain gauge sensor can measure strain or stress based on changes in electric resistance caused by an infinitesimal deformation of any member having the strain gauge sensor thereon when the stress wave propagates through the vehicular frame member. Further, the piezoelectric strain sensor can measure strain or stress based on a piezoelectric effect caused by an infinitesimal deformation of any member having the piezoelectric strain sensor thereon when the stress wave propagates through the vehicular frame member.

The biasing member 140 is disposed between the opposite end 122b of the second rod 122 and the opposite end portion of the housing 110 (specifically, the inner surface of the cap 113) to bias both the first rod 121 and the second rod 122 toward the frame member. A disc spring, a compression spring, or a rubber block may be employed as the biasing member 140. The biasing force of the biasing member 140 can be variously selected by adjusting a compressive force of the disc spring, the compression spring, or the rubber block according to the type of a vehicle, to which the module 100 is equipped. Therefore, the stress wave can be transferred to the rod member 120 without any disturbance irrespective of the vehicular type.

Further, the module 100 is configured such that a magnitude of impedance of the first rod 121 is larger than that of the second rod 122 and the magnitude of impedance of the second rod 122 is larger than that of the biasing member 140. For example, the first rod 121 may be made from tungsten and the second rod 122 may be made from aluminum and the biasing member 140 may be made from a rubber block.

Such a module 100 may be mounted to a front-side member of vehicular frame members or a crash box connecting the front-side member and a bumper for purposes of detecting a frontal crash or an offset crash of a vehicle. Further, the module 100 may be mounted to a rocker member of the vehicular frame members for purposes of detecting a right side or left side crash of a vehicle.

Figure 5:
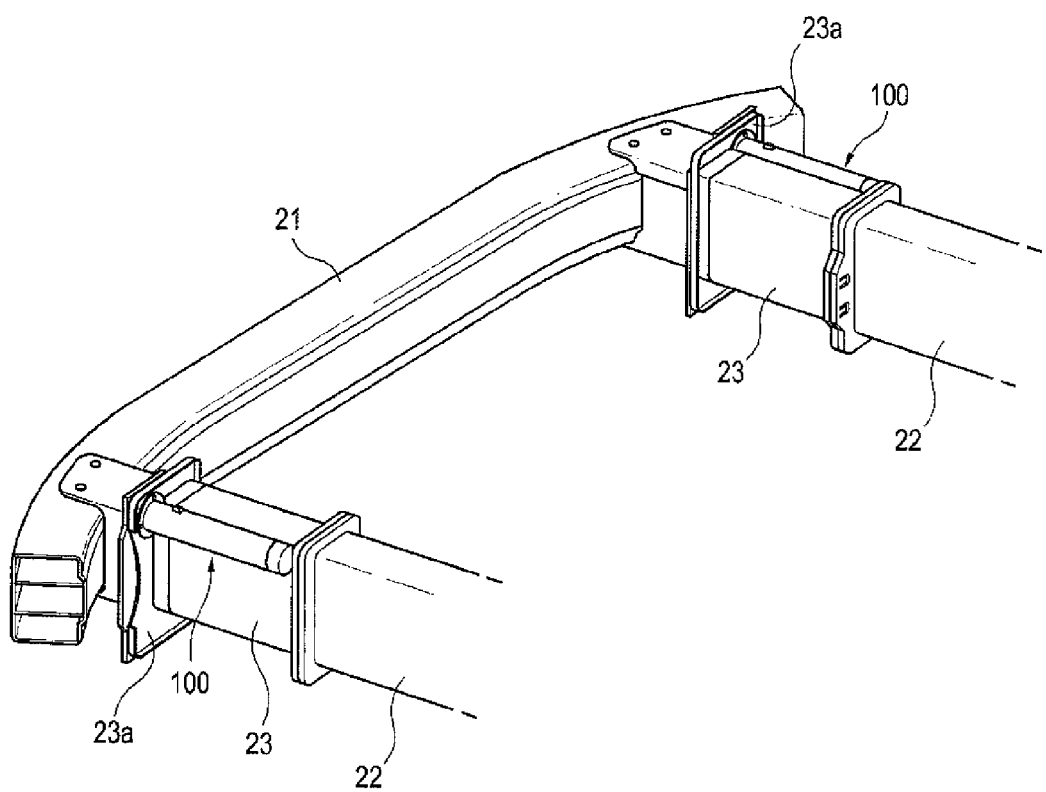
FIG. 5 is a perspective view showing that the module for detecting a vehicle crash of the present invention is mounted to one of vehicular frame members.

FIG. 5 is a perspective view showing the module 100 of the present invention is mounted to the crash box of the vehicular frame members. As shown in FIG. 5, the crash box 23 interconnects the bumper 21 and the front-side member 22 and the module 100 may be mounted to a flange 23a provided at the crash box 23. The module 100 may be mounted to a flange which can be provided at the front-side member 22 or a rocker member (not shown). Furthermore, the module 100 may be mounted to the inside of the crash box 23, the inside of the front-side member 22 or the inside of the rocker member.

When the module 100 is mounted to the flange 23a of the crash box, as shown in FIG. 5, the one end 121a of the first rod 121 is brought into close contact with the flange 23a of the crash box 23, while being biased toward the flange 23a of the crash box. In the event of the frontal or offset crash, the stress wave caused by such crash propagates from the bumper 21 via the crash box 23 to the front-side member 22. In such a case, since the first and second rods 121, 122 are oriented along a propagation path of the stress wave and the first and second sensors 131, 132 are mounted to the first and second rods 121 and 122 respectively, the stress wave is measured sequentially at a predetermined time interval by the first and second sensors 131, 132.

The first and second sensors 131, 132 send respective outputs (e.g., voltage signal) to the electronic control unit of the airbag deploying system after detecting the stress wave. Since the first and second sensors 131, 132 are situated along a length direction of the rod member 120 at a predetermined interval, the output signals from the first and second sensors 131, 132 are inputted to the electronic control unit at a predetermined time interval.

Figure 6:
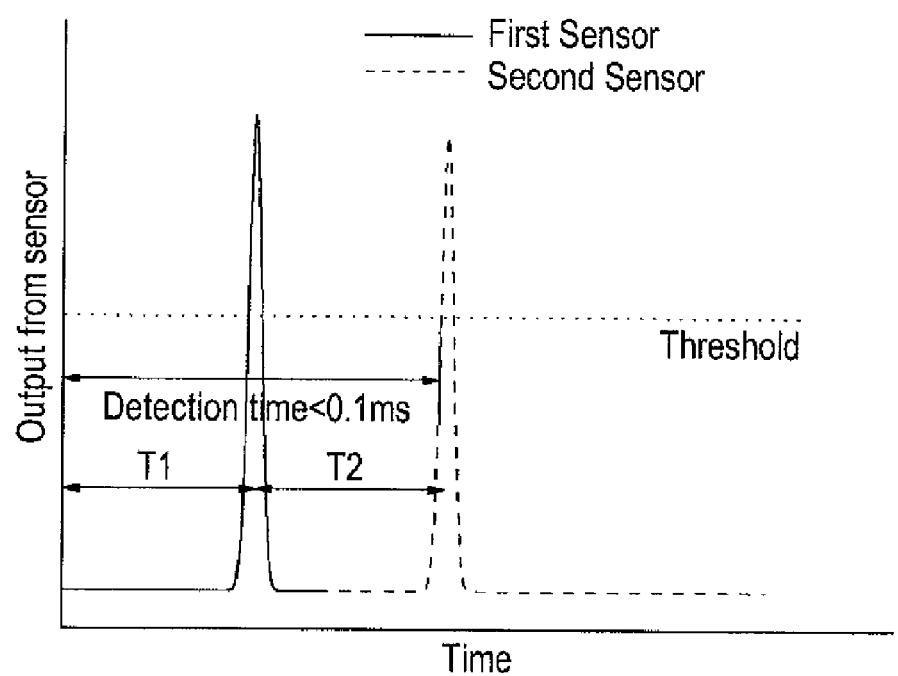
FIG. 6 is a graph illustrating outputs from sensors shown in FIG. 2 according to time.

FIG. 6 is graph illustrating the outputs from the sensors 131 and 132 shown in FIG. 4 according to time.

In FIG. 6, T1 indicates a time interval between a point of time of the crash and a point of time of the measurement at the first sensor 131. T2 indicates a time interval between the point of time of the measurement at the first sensor 131 and a point of time of the measurement at the second sensor 132. The time interval T1 may depend on a distance between the collision or impact point and the first sensor. Preferably, the sum of the above-mentioned time intervals T1 and T2 are predetermined such that it is within 0.1 ms or a desired time limit suitable for starting the deployment of airbags.

In general, it is known that stress wave propagates through a metallic plate, which is usable for the vehicular frame members, at a rate of approximately 5000 m/s. In case the elapsed time spent from the collision until the sensor (e.g., the second sensor 132) positioned farthest from the collision or impact point (e.g., the bumper 21) detects the stress wave and outputs its signals may be set within 0.1 ms, the module 100 can output the crash signals to the electronic control unit of the airbag deploying system within 0.1 ms.

The electronic control unit monitors all outputs from the first and second sensors 131 and 132 and examines whether all outputs from the first and second sensors 131 and 132 exceed a predetermined threshold. Said threshold may be preset as a criterion for determining the deployment of airbags and may be programmed into the electronic control unit. In case all the outputs exceed the threshold, the electronic control unit is operated to deploy the airbags.

Figure 7:
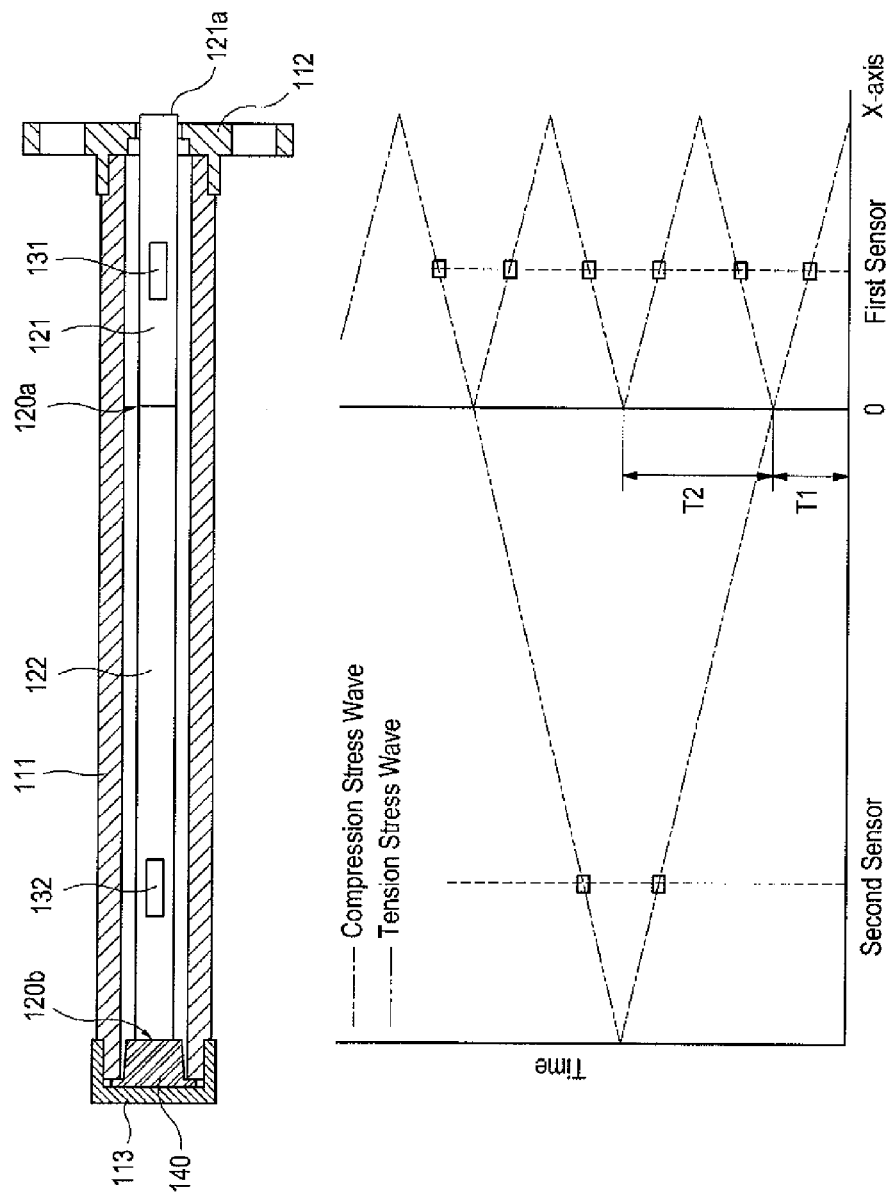
FIG. 7 is an X-T diagram showing movement of a stress wave propagating through a first rod and a second rod.

FIG. 7 is an X-T diagram showing movement of the stress wave propagating through the first rod 121 and the second rod 122 after the vehicle crash. The stress wave generated at the time of the crash propagates to the first rod 121 after passing through the vehicular frame members (e.g., the bumper 21, the crash box 23, the front-side member 22, the rocker member, etc.). The stress wave introduced to the first rod 121 propagates in such a way that a portion thereof is transmitted to the second rod 122 across the first interface 120*a* and the remainder thereof is reflected to the first rod 121 at the first interface 120*a*. If the stress wave introduced to the second rod 122 reaches the second interface 120*b*, a portion thereof is transmitted to the biasing member 140 and the remainder thereof is reflected toward the second rod 122.

The impedances of the tungsten-made first rod 121, the aluminum-made second rod 122 and the rubber-made biasing member 140 can be represented as the following Equations 1 to 3.

The impedance of the first rod 121:

$$Z_w = \rho_w C_w = 88.5 \text{ mg/mm}^2 \text{ μs} \quad \text{[Equation 1]}$$

The impedance of the second rod 122:

$$Z_{Al} = \rho_{Al} C_{Al} = 14.2 \text{ mg/mm}^2 \text{ μs} \quad \text{[Equation 2]}$$

The impedance of the biasing member 140:

$$Z_{CR} = \rho_{CR} C_{CR} = 0.09 \text{ mg/mm}^2 \text{ μs} \quad \text{[Equation 3]}$$

In the Equations 1 to 3, ρ is the density of a material. Further, C is the velocity of a vertical stress in a material and can be represented by one-dimensional stress wave theory as $C = \sqrt{E/\rho}$, wherein E is an elastic modulus or a Young's modulus of a material.

Those impedances function as parameters for determining the magnitudes and signs of the transmitting stress wave and the reflecting stress wave when the introduced stress wave passes across the interfaces 120*a* and 120*b*.

Since the impedance of the first rod 121 is larger than the impedance of the second rod 122, the following Equations 4 and 5 are obtained with regard to the first interface 120*a*.

$$\frac{\sigma_T}{\sigma_I} = \frac{2Z_{Al}}{Z_{Al} + Z_W} \approx 0.28 \quad \text{[Equation 4]}$$

$$\frac{\sigma_R}{\sigma_I} = \frac{Z_{Al} - Z_W}{Z_{Al} + Z_W} \approx -0.72 \quad \text{[Equation 5]}$$

In Equations 4 and 5, $\sigma_I$ means an incident stress wave, and $\sigma_T$ means a transmitted stress wave that is transmitted to the second rod 122 across the first interface 120*a*, and $\sigma_R$ means a reflected stress wave that is reflected again in an incidence direction at the first interface 120*a*.

As can be seen from Equations 4 and 5, in case a compression stress wave, for example, is introduced to the first rod 121 and passes across the first interface 120*a*, one compression stress wave (with the same sign), which has a magnitude equal to about 28% of the magnitude of the compression stress wave introduced to the first rod 121, is transmitted to the second rod 122, while the other tension stress wave (with the opposite sign), which has a magnitude equal to about 72% of the magnitude of the compression stress wave introduced to the first rod 121, is reflected to the first rod 121. In other words, if a compression stress wave reaches the first interface 120*a* of the first and second rods 121, 122, one compression stress wave is transmitted to the second rod 122 next to the first rod 121 and the other tension stress wave is reflected back to the first rod 121. Thus, a compression stress wave is allowed to coexist with a tension stress wave in the first rod 121. Further, such two stress waves (i.e., compression and tension stress waves) overlap each other in the same time period, thereby creating a stress wave having a triangular waveform due to destructive interference. Consequently, the first sensor 131 detects such a stress wave having a triangular waveform and output its signal.

Further, since the magnitude of the impedance of the second rod 122 is larger than the magnitude of the impedance of the biasing member 140, the following Equations 6 and 7 are obtained with regard to the second interface 120*b*.

$$\frac{\sigma_T}{\sigma_I} = \frac{2Z_{CR}}{Z_{CR} + Z_{Al}} \approx 0.01 \quad \text{[Equation 6]}$$

$$\frac{\sigma_R}{\sigma_I} = \frac{Z_{CR} - Z_{Al}}{Z_{CR} + Z_{Al}} \approx -0.99 \quad \text{[Equation 7]}$$

As can be seen from Equations 6 and 7, in case a compression stress wave, for example, is introduced to the second rod 122 and passes across the second interface 120*b*, one compression stress wave (with the same sign), which has a magnitude equal to about 1% of the magnitude of the compression stress wave introduced to the second rod 122, is transmitted to the biasing members 140, while the other tension stress wave (with the opposite sign), which has a magnitude equal to about 99% of the magnitude of the compression stress wave introduced to the second rod 122, is reflected to the second rod 122. In other words, if a compression stress wave reaches the second interface 120*a* of the second rod 122 and the biasing member 140, one compression stress wave is transmitted to the biasing member 140 next to the second rod 122 and the other tension stress wave is reflected back to the second rod 122. Thus, a compression stress wave is allowed to coexist with a tension stress wave in the second rod 122. Further, such two stress waves (i.e., compression and tension stress waves) overlap each other in the same time period, thereby creating a stress wave having a triangular waveform due to destructive interference. Consequently, the second sensor 132 detects such a stress wave having a triangular waveform and outputs its signal.

As described above, since the first rod 121, the second rod 122 and the biasing member 140 are configured such that their magnitudes of impedance diminish one after another (e.g., since they are made from tungsten, aluminum and rubber, respectively), the initial incident compression stress wave can be converted into the reflecting tension stress wave or can be formed into the transmitting compression stress wave at the first interface 120a or the second interface 120b.

Figure 8:
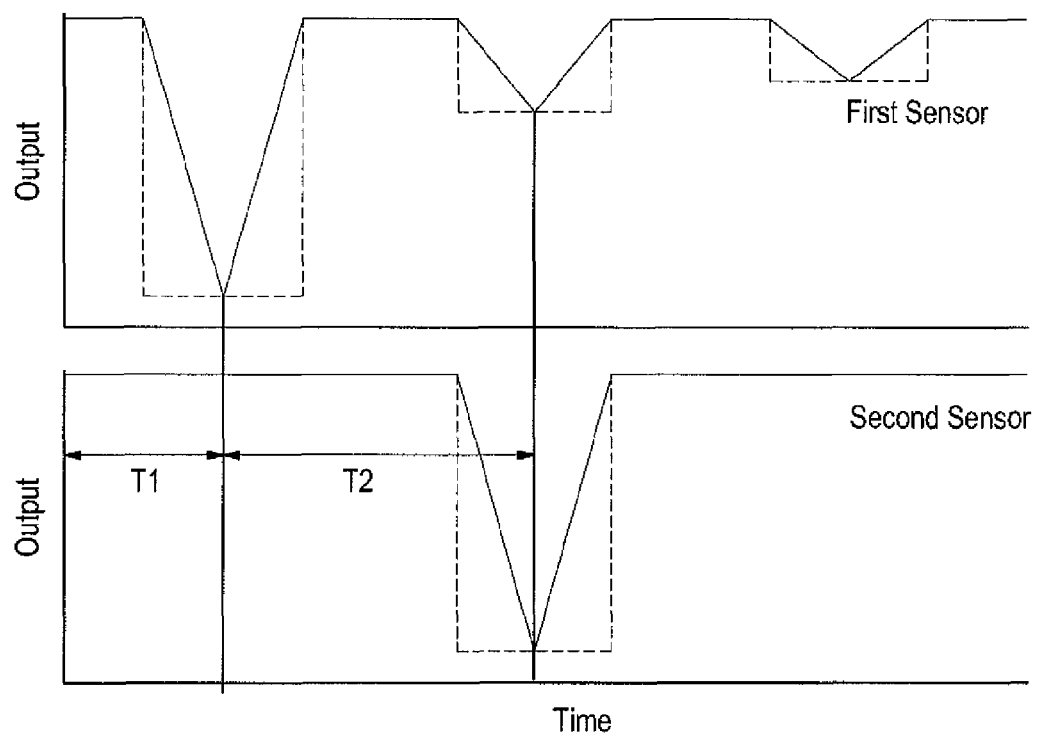
FIG. 8 is a graph showing outputs from the sensors, which are sequentially measured according to time, and which are expected from the X-T diagram shown in FIG. 7.

In a graph shown in FIG. 7, a one-dot chain line represents the compression stress wave, while a two-dot chain line represents the tension stress wave. The signals output from the first sensor 131 and the second sensor 132 can be expected as shown in FIG. 8, which is obtained from FIG. 7 based on the above-discussed principle.

As described above, since a stress wave having a triangular waveform exist in the first rod 121 and the second rod 122 due to the overlap of the compression and tension stress wave after a vehicle crash, the signals from the first and second sensors 131 and 132 are input to the electronic control unit of the airbag deploying system as clearly discriminated at a predetermined time interval.

The rod member 120 may have a shorter length for purposes of miniaturization. However, since the rod member 120 are divided into the first and second rods 121, 122, the signals from the sensors 131 and 132 can be distinctively and non-overlappingly input to the electronic control unit. Since the first rod 121 has a limited length, the shorter the length of the first rod 121 is, the shorter the time required for measuring the stress wave passing therethrough will be. Also, the time interval between the points of time of the measurement at the first and second sensors 131, 132 depends on the distances between the sensors 131 and 132. Therefore, although the rod member 120 is designed to have a shorter length, it is possible to detect the crash within 0.1 ms or less using the module 100 by appropriately adjusting the length of the first rod 121 and the distances between the first sensor 131 and the second sensor 132. In addition, as described above, if the first rod 121, the second rod 122 and the biasing member 140 are configured such that their magnitudes of impedance diminish one after another, the stress wave with a triangular waveform exists in the first rod 121 and the second rod 122, and therefore, the signals from the first sensor 131 and the second sensor 132 can be nonoverlappingly and more clearly inputted to the electronic control unit. Accordingly, it is possible not only to detect the vehicle crash within 0.1 ms or within a shorter time than that by means of the module 100, but also to miniaturize the module 100.

Figure 9:
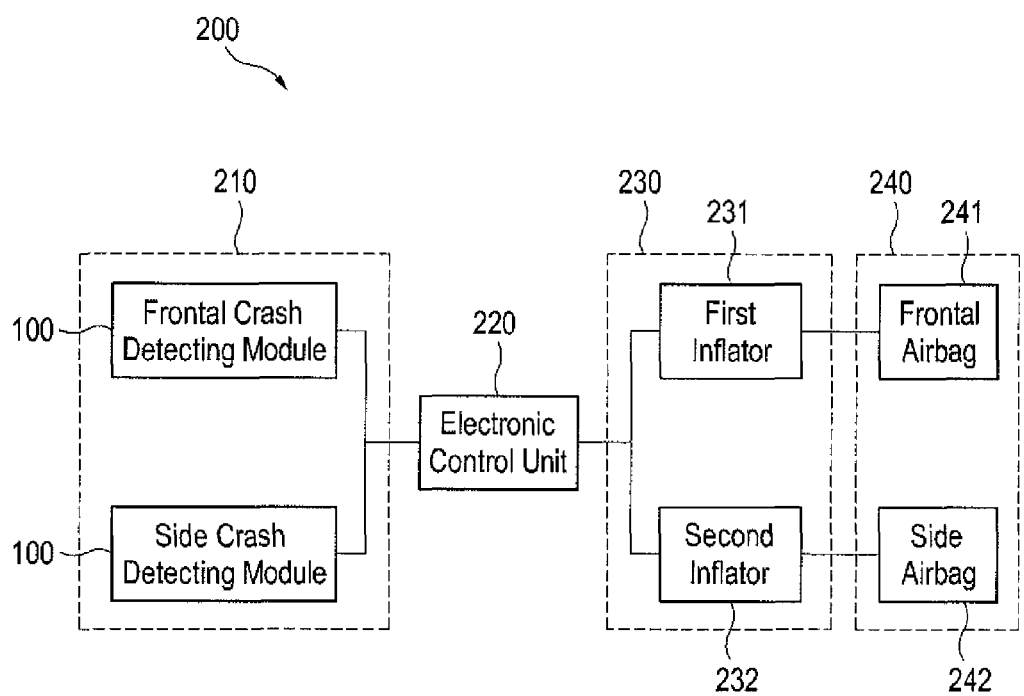
FIG. 9 is a schematic block diagram showing a constitution of an airbag deploying system for a vehicle according to one example embodiment of the present invention.

FIG. 9 is a schematic block diagram showing a constitution of an airbag deploying system for a vehicle according to one embodiment of the present invention.

The airbag deploying system 200 is installed on a vehicle equipped with a passenger protective device such as an inflatable airbag. When the vehicle is subjected to an impact over a predetermined threshold due to a crash, the airbag is inflated to protect a driver or a passenger.

The airbag deploying system 200 comprises a crash detecting section 210, an electronic control unit 220, an inflator section 230 and an airbag 240. The crash detecting section 210 includes a plurality of frontal crash detecting modules or side crash detecting modules. The electronic control unit 220 monitors signals from the frontal or side crash detecting module of the crash detecting section 210 to thereby output an actuation signal based on the signals. The inflator section 230 generates gas in response to the actuation signal from the electronic control unit 220. The airbag 240 is operatively coupled to the inflator section 230 and is deployed by supply of the gas generated from the inflator section 230.

The vehicle crash detecting module 100 of the present invention, which is described with reference to FIGS. 3 to 8, is used as said frontal or side crash detecting module. The crash detecting module 100 may be mounted to the crash box of the vehicular frame members or to the outside or inside of the front-side member of the vehicular frame members for purposes of detecting the frontal or offset crash. Further, the crash detecting module 100 may be mounted to the outside or inside of the rocker member of the vehicular frame members for purposes of detecting the side crash. The crash detecting module 100 sequentially detects the stress wave, which is generated by an impact applied to the vehicle in the event of a crash and propagates through the vehicular frame members, and outputs signals to the electronic control unit 220.

The airbag 240 may comprise a frontal airbag 241, which is allowed to be deployed in the event of a vehicular frontal or offset crash, and a side airbag 242, which is allowed to be deployed in the event of a vehicular side crash. The inflator section 230 may comprise a first inflator 231 for deploying the frontal airbag 241 and a second inflator 232 for the side airbag 242.

When the frontal crash or the side crash, the magnitude of which is sufficiently high for the frontal or side airbag 241 or 242 to be deployed, actually occurs, the signals from the first sensor 131 and the second sensor 132 are sequentially inputted to the electronic control unit 220 within 0.1 ms or less. Then, the electronic control unit 220 monitors the output signals and determines whether to deploy the airbag 241 or 242. In case the signals from the first sensor 131 and the second sensor 132 are inputted sequentially and all of their magnitudes exceed the preset threshold, the electronic control unit 220 determines that the airbag 241 or 242 must be deployed. Thereafter, the electronic control unit 220 outputs the actuation signal to the inflator 221 or 222 corresponding to the detected crash. Finally, the airbag 241 or 242, which corresponds to the detected crash, is deployed by the actuation of the inflator 231 or 232.

As such, the airbag deploying system according to the present invention can reduce the elapsed time required for detecting the occurrence of the vehicular frontal or side crash within approximately 0.1 ms or less, thereby deploying the airbag earlier than a prior art airbag system having a detection time of 10~20 ms.

Embodiments of the present invention may relate to a module for detecting a vehicle crash and an airbag deploying system including the same. The crash detecting module detects a stress wave propagating through vehicular frame members after crash and outputs signals relating to such a crash, thereby allowing earlier detection of crash. Since a stress wave is allowed to propagate through two rods having different impedance, the signals from the sensors can be clearly and distinctively outputted. Further, the rods can be designed to have a shorter length and the module can be further miniaturized. Since the crash detecting module can be mounted to the vehicular frame member, the works associated with mounting, repairing and replacing crash sensors become easier. Furthermore, the airbag deploying system having such a crash detecting module can deploy its airbags earlier than a prior art airbag deploying system.

A module for detecting a vehicle crash may be provided. The module for detecting a vehicle crash may include first and second rods, first and second sensors, a housing, and a biasing member. The first rod may be adapted to contact to a vehicular frame member at one end thereof. The second rod may be adapted to contact to the opposite end of the first rod at one end thereof. The first and second sensors may be mounted to the first and second rods, respectively. The first sensor may detect a stress wave propagating through the first rod and output a signal. The second sensor may detect a stress wave propagating through the second rod and output a signal. The housing may support the first and second rods. The housing may be mounted to the frame member at one end portion thereof such that the one end of the first rod is brought into contact with the frame member. The biasing member may be disposed between the opposite end of the second rod and the opposite end portion of the housing for biasing the first and second rods toward the frame member. A magnitude of impedance of the first rod may be larger than that of the second rod and the magnitude of impedance of the second rod may be larger than that of the biasing member.

A module for detecting a vehicle crash may be further provided. The module for detecting a vehicle crash may include a housing, first and second rods, first and second sensors and a biasing member. The housing may be mounted to a vehicular frame member at one end portion thereof. The first and second rods may be housed in the housing. The first rod may be contacted to the frame member at one end thereof through the one end portion of the housing. The second rod may be contacted to the opposite end of the first rod and being disposed between the first rod and the opposite end portion of the housing. The first and second sensors may be mounted to the first and second rods, respectively. The first sensor may detect a stress wave propagating through the first rod and output a signal. The second sensor may detect a stress wave propagating through the second rod and output a signal. The biasing member may be disposed between the second rod and the opposite end portion of the housing for biasing the first and second rods toward the frame member. A magnitude of impedance of the first rod may be larger than that of the second rod and the magnitude of impedance of the second rod may be larger than that of the biasing member.

In the module, the first rod may be made from tungsten and the second rod may be made from aluminum and the biasing member may be made from rubber. Further, the first and second sensors may include a strain gauge sensor or a piezoelectric sensor.

An airbag deploying system may be provided. The airbag deploying system may include the above-described module, an electronic control unit, an inflator and an airbag. The electronic control unit may monitor the signals from the first and second sensor of the module and output an actuation signal when each of the signals exceeds a predetermined threshold. The inflator may generate gas in response to the actuation signal. The airbag may be operatively coupled to the inflator and be deployed by supply of the gas generated from the inflator.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A module for detecting a vehicle crash, comprising:
a first rod adapted to contact to a vehicular frame member at one end thereof and a second rod adapted to contact to the opposite end of the first rod at one end thereof;
first and second sensors mounted to the first and second rods, respectively, the first sensor configured to detect stress wave propagating through the first rod and to output a signal, the second sensor configured to detect stress wave propagating through the second rod and to output a signal;
a housing configured to support the first and second rods, the housing being mounted to the frame member at one end portion thereof such that the one end of the first rod is brought into contact with the frame member; and
a biasing member disposed between the opposite end of the second rod and the opposite end portion of the housing for biasing the first and second rods toward the frame member;
wherein a magnitude of impedance of the first rod is larger than that of the second rod and the magnitude of impedance of the second rod is larger than that of the biasing member.

2. The module of claim 1, wherein the first rod is made from tungsten and the second rod is made from aluminum and the biasing member is made from rubber.

3. The module of claim 1, wherein the first and second sensors include at least one of a strain gauge sensor and a piezoelectric sensor.

4. An airbag deploying system for a vehicle, comprising:
a module configured to detect a vehicle crash according to claim 1;
an electronic control unit configured to monitor the signals from the first and second sensors of the module and outputting an actuation signal when each of the signals exceeds a predetermined threshold;
an inflator for generating gas in response to the actuation signal; and
an airbag operatively coupled to the inflator and being deployed by supply of the gas generated from the inflator.

5. The airbag deploying system of claim 4, wherein the first rod is made from tungsten and the second rod is made from aluminum and the biasing member is made from rubber.

6. The airbag deploying system of claim 4, wherein the sensors include at least one of a strain gauge sensor and a piezoelectric sensor.

7. A module for detecting a vehicle crash, comprising:
a housing mounted to a vehicular frame member at one end portion thereof;

first and second rods housed in the housing, the first rod being contacted to the frame member at one end thereof through the one end portion of the housing, the second rod being contacted to the opposite end of the first rod and being disposed between the first rod and the opposite end portion of the housing;

first and second sensors mounted to the first and second rods, respectively, the first sensor configured to detect stress wave propagating through the first rod and outputting a signal, the second sensor configured to detect stress wave propagating through the second rod and outputting a signal; and a biasing member disposed between the second rod and the opposite end portion of the housing for biasing the first and second rods toward the frame member;

wherein a magnitude of impedance of the first rod is larger than that of the second rod and the magnitude of impedance of the second rod is larger than that of the biasing member.

8. The module of claim 7, wherein the first rod is made from tungsten and the second rod is made from aluminum and the biasing member is made from rubber.

9. The module of claim 7, wherein the first and second sensors include at least one of a strain gauge sensor and a piezoelectric sensor.

10. An airbag deploying system for a vehicle, comprising:
a module configured to detect a vehicle crash according to claim 7;
an electronic control unit configured to monitor the signals from the first and second sensors of the module and outputting an actuation signal when each of the signals exceeds a predetermined threshold;
an inflator configured to generate gas in response to the actuation signal; and
an airbag operatively coupled to the inflator and being deployed by supply of the gas generated from the inflator.

11. The airbag deploying system of claim 10, wherein the first rod is made from tungsten and the second rod is made from aluminum and the biasing member is made from rubber.

12. The airbag deploying system of claim 10, wherein the sensors include at least one of a strain gauge sensor and a piezoelectric sensor.

* * * * *